(12) United States Patent
Tohta et al.

(10) Patent No.: US 7,264,574 B2
(45) Date of Patent: Sep. 4, 2007

(54) TORQUE CONVERTER LOCKUP CAPACITY CONTROL DEVICE

(75) Inventors: Yuzuru Tohta, Yokohama (JP); Hiroyuki Takenaka, Yamato (JP); Kenichiro Murakami, Atsugi (JP); Osamu Sato, Fujisawa (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 170 days.

(21) Appl. No.: 11/232,237

(22) Filed: Sep. 22, 2005

(65) Prior Publication Data

US 2006/0073937 A1 Apr. 6, 2006

(30) Foreign Application Priority Data

Oct. 1, 2004 (JP) ............................. 2004-290584

(51) Int. Cl.
*F16H 45/02* (2006.01)
(52) U.S. Cl. ...................................... 477/169
(58) Field of Classification Search ................ 477/168, 477/169
See application file for complete search history.

(56) References Cited

U.S. PATENT DOCUMENTS

| 5,620,394 | A | * | 4/1997 | Iizuka | ........................ | 477/168 |
| 5,935,043 | A | * | 8/1999 | Watanabe et al. | ........... | 477/169 |
| 6,663,533 | B2 | * | 12/2003 | Toyoda et al. | ................ | 477/62 |
| 6,780,140 | B2 | * | 8/2004 | Okamoto et al. | ............. | 477/62 |

FOREIGN PATENT DOCUMENTS

JP 2001-208193 A 8/2001

\* cited by examiner

*Primary Examiner*—Dirk Wright
(74) *Attorney, Agent, or Firm*—Global IP Counselors, LLP

(57) ABSTRACT

A torque converter lockup capacity control device is configured to conduct coast-time lockup control during coast-running in order to prevent engine stall, shock from occurring in the output shaft of a transmission due to lockup when a driver releases an acceleration pedal and the running condition switches from a drive running condition to a coast-running condition. Torque converter lockup occurs because the engine output torque drops from a time on when the throttle opening degree becomes zero. Thus, during a period from the time on until fuel cut-in at time, the lockup capacity is lowered to a minimum capacity corresponding to a standby pressure and lockup is avoided. The lockup capacity is raised to a larger value from the predetermined time on, and ordinary coast-time lockup control is executed.

17 Claims, 9 Drawing Sheets

TORQUE CONVERTER LOCKUP CAPACITY CONTROL DEVICE

CROSS-REFERENCE TO RELATED APPLICATIONS

This application claims priority under 35 U.S.C. § 119 to Japanese Patent Application No. 2004-290584. The entire disclosure of Japanese Patent Application No. 2004-290584 is hereby incorporated herein by reference.

BACKGROUND OF THE INVENTION

1. Field of the Invention

The present invention generally relates to a torque converter disposed between an engine and a transmission. More specifically, the present invention relates to torque converter lockup control technology that controls the lockup capacity of the torque converter during a coast-running condition, i.e., when the accelerator pedal is released.

2. Background Information

A torque converter is typically disposed between an engine and an automatic transmission including a continuously variable transmission. The torque converter has a torque increasing action and a torque fluctuation absorbing function. However, a rotational difference sometimes arises between the rotation of the pump impeller, which is an engine input element, and the turbine runner, which is a transmission output element. This rotational difference is accompanied by a slip causing the transmission efficiency to deteriorate. Thus, conventionally a lockup mechanism has been disposed which eliminates slip by mechanically locking the input/output elements when the torque increasing action and the torque fluctuation absorbing function are unnecessary. The lockup of the input/output elements is conducted by a lockup clutch. The lockup clutch control device controls the lockup capacity, which is the clutch lockup pressure, whereby it is possible for the lockup clutch to turn the lockup state into a complete lock state or a slip-lock state.

Recently, vehicles have been developed that are provided with a fuel cutting function that stops the injection of fuel to the combustion chamber of the engine in order to prevent useless fuel consumption during a vehicle coast-running condition at the time of acceleration pedal release when the driver releases his/her foot from the acceleration pedal. It is common to set a predetermined cut-in delay time (start delay time) for performing the fuel cutting function such that fuel cutting is executed after all of the in-cylinder air present from the completely closed throttle valve to the combustion chamber reaches the engine after the acceleration pedal release. During fuel cutting execution, it is necessary to prevent the engine from stalling by mechanically coupling the engine to tire rotational elements that rotate with the tires during coast-running. Specifically, lockup resulting from the slip lockup is conducted to prevent the engine rotation from becoming zero.

On example of a conventional lockup control device is disclosed in Japanese Laid Open Patent Publication No. 2001-208193. In this publication, it is disclosed to prevent the engine from stalling by controlling the lockup capacity on the basis of the vehicle running condition when a lockup resulting from slip lockup is conducted. The lockup capacity control device disclosed in Japanese Laid Open Patent Publication No. 2001-208193 controls the lockup capacity in accordance with the state of the operational load of the in-vehicle air conditioner. Namely, the lockup capacity is increased when the operational load of the in-vehicle air conditioner is high, whereby the reverse drive torque (coast torque) transmitted from the wheels to the engine is reliably transmitted to the engine to maintain the engine rotation. The lockup capacity is reduced when the operational load of the in-vehicle air conditioner is low, whereby quick release of the lockup (slip-lock state) is enabled and engine stall is prevented.

In view of the above, it will be apparent to those skilled in the art from this disclosure that there exists a need for an improved torque converter. This invention addresses this need in the art as well as other needs, which will become apparent to those skilled in the art from this disclosure.

SUMMARY OF THE INVENTION

However, it has been discovered that the following problems occur in the conventional lockup capacity control device described above. These problems will be described on the basis of the time chart shown in FIG. 9. In a drive-running condition (where the engine is driving the transmission, i.e., running in a state where fuel is being supplied), the rotation of the input element (engine rotation) of the torque converter is higher than the rotation of the output element (turbine rotation), and the lockup capacity is set to a predetermined value Pd. In contrast, in a coast-running condition, the rotation of the input element (engine rotation) of the torque converter is lower than the rotation of the output element (turbine rotation), and the lockup capacity is set to Pc, which is smaller than the predetermined value.

Consequently, when the driver releases his/her foot from the acceleration pedal and the throttle opening degree is completely closed (zero) at the time t1 in FIG. 9, the running condition moves from a drive-running to a coast-running. Thus, the torque converter enters a transient state where the high/low rotational speed relationship between the engine rotational speed and the turbine rotational speed are reversed from the time t1 to until the time t2. At a certain point in time in this transient state (time t1 to t2), the engine rotational and the turbine rotational speeds match, but in actuality it is not at a specific finite point in time but rather extends over a certain period of time (t3 to t2 in FIG. 9). Namely, from the time t1 on when the throttle opening becomes zero, the engine output torque decreases and the lockup capacity maintains a coast-time lockup capacity LUc. Thus, the lockup mechanism operates as described above at the time t3 when both the engine rotational and the turbine rotational speeds substantially match, i.e., where the slip amount is zero, and thus, shock occurs in the output shaft torque of the automatic transmission so that the driver and passenger ride performance has been impaired.

Also, if fuel cutting is executed at the time t2 while the engine rotation and the turbine rotation are locked together, then the engine output torque abruptly drops, and when the output torque abruptly changes (time t2), this causes shock in the output shaft torque of the automatic transmission, so that the driver and passenger ride performance has been impaired.

The problem of shock in the transient state is of concern not only in the lockup capacity control device disclosed in Japanese Laid Open Patent Publication No. 2001-208193 that increases/decrease the lockup capacity in accordance with the operational load of the in-vehicle air conditioner, but also in lockup capacity control devices that apply a lockup capacity to the torque converter while the throttle opening degree is zero.

One object of the present invention is to provide a lockup capacity control that can effectively avoid shock in the transient state. In order to achieve the object, the present invention provides a torque converter lockup capacity control device that basically comprises a vehicle running condition determining section and a lockup capacity control section. The vehicle running condition determining section is configured to detect a vehicle running condition. The lockup capacity control section is configured to control a lockup capacity of a torque converter disposed between an engine and a transmission in accordance with the vehicle running condition. The lockup capacity control section is further configured to control the lockup capacity to a first lockup capacity during a predetermined time from an acceleration pedal release when the lockup capacity control section switches from a drive slip control to a coast slip control. The lockup capacity control section is further configured to control the lockup capacity to a second lockup capacity that is larger than the first lockup capacity after the predetermined time has elapsed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
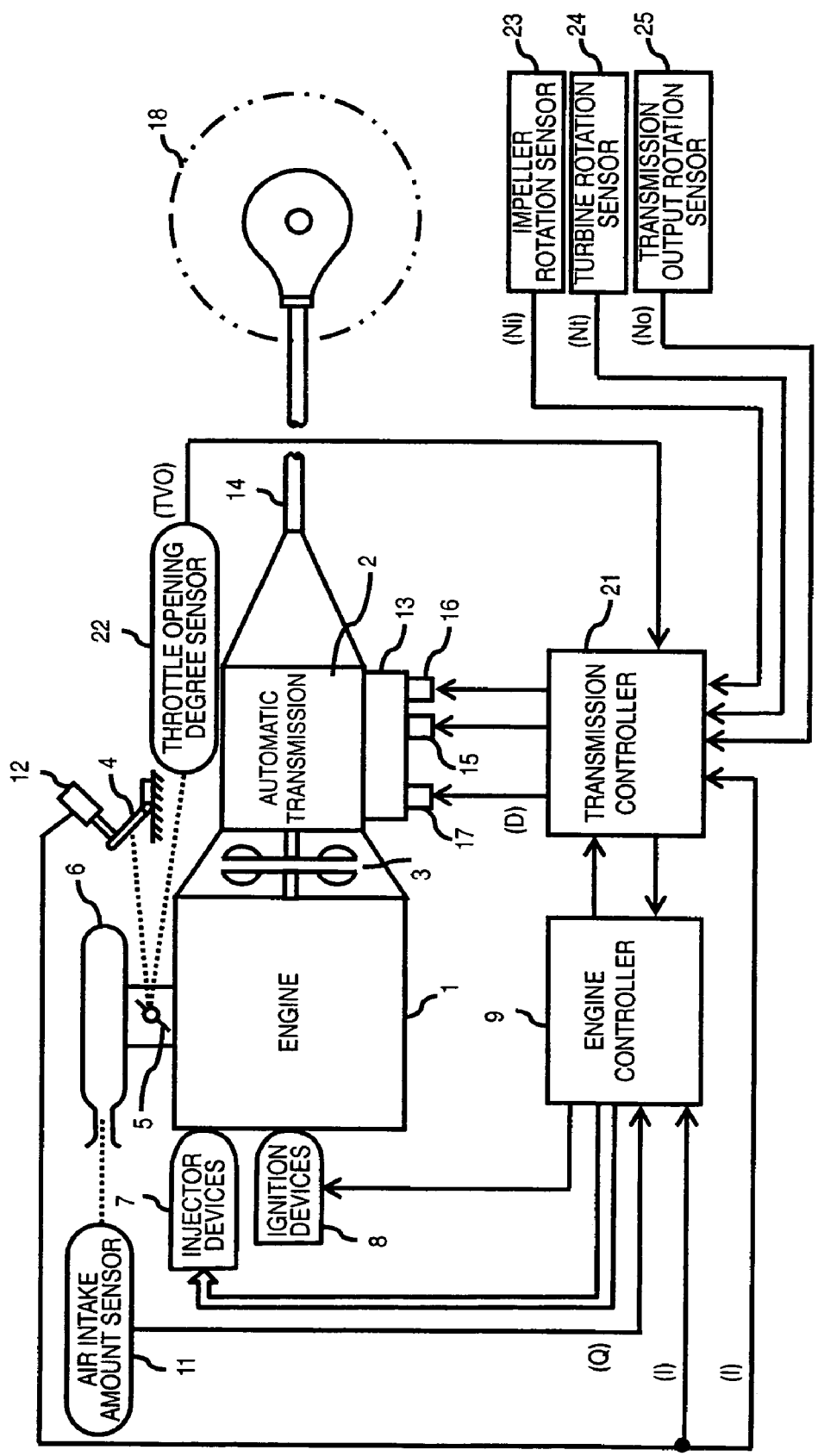
FIG. 1 is a schematic explanatory diagram showing a vehicle drive train, together with a control system including a lockup capacity control device that is used in accordance with the embodiments of the present invention.

Referring initially to FIG. 1, a vehicle drive train having a control system is illustrated that includes a lockup capacity control device in accordance with a first embodiment of the present invention. The vehicle drive train basically includes an engine 1, an automatic transmission 2, and a torque converter 3 that is operatively disposed between the engine 1 and the automatic transmission 2 to transmit torque therebetween.

The engine 1 is operatively coupled to an acceleration pedal 4 for operating a throttle valve 5 of the engine 1 to regulate a throttle valve opening. The throttle valve opening is increased in accordance with the depression amount of an acceleration pedal 4 in a conventional manner. The vehicle is considered to be in a coast running condition or state when the accelerator pedal 4 is put in a released state and a drive running condition or state when the accelerator pedal 4 is depressed.

The engine 1 receives intake air through an air cleaner 6. The amount of intake air received by the engine 1 corresponds to the throttle opening amount and the engine rotational speed. The engine 1 also includes a plurality of fuel injectors 7 and a plurality of ignition devices or spark plugs 8, with one of the fuel injectors 7 and ignition devices or spark plugs 8 being provided for each of the cylinders of the engine 1.

An engine controller 9 is operatively coupled to these components to control the operation of the engine 1. In particular, the engine controller 9 is operatively coupled to a plurality of sensors and/or switches, including but not limited to, an air intake amount sensor 11 and an idle switch 12, to control the operation of the engine 1. A signal Q is outputted from the air intake amount sensor 11 that is indicative of an engine air intake amount Q. A signal I outputted from the idle switch 12 that is indicative of when the acceleration pedal 4 is released or depressed, e.g., the idle switch 12 is switched "ON" when the acceleration pedal 4 is released. Theses signals Q and A are inputted to the engine controller 9. At least based on this inputted information, the engine controller 9 is configured to inject a predetermined amount of fuel to selected cylinders from the injectors 7 in accordance with a running condition or state of the engine 1, and conducts fuel cutting that stops the supply of fuel during a coast-running condition and fuel cutting recovery that resumes the supply of fuel. The start of fuel cutting (also called fuel cut-in) is conducted after a predetermined cut-in delay time has elapsed after the throttle valve 5 has completely closed during running. Usually the fuel cut-in delay time is the time necessary for all of the intake air between the completely closed throttle valve 5 and the combustion chamber of the engine 1 to be sucked into the combustion chamber of the engine 1. However, in the present embodiment, a cut-in delay time that is longer than the usual cut-in delay time is used for reasons that will be described later.

The engine controller 9 preferably includes a microcomputer with various engine control programs to control the operation of the engine 1. The engine controller 9 can also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the engine controller 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

On the basis of the input information, the engine controller 9 also ignites, at a predetermined timing, the spark plugs 8 of selected cylinders in accordance with the running condition or state of the engine 1. Thus, the engine 1 is run in a predetermined manner, and the fuel is cut in a predetermined manner during a coast-running condition.

Moreover, when the engine rotational speed drops to a value equal to or less than a predetermined value, the engine controller 9 prevents the engine from stalling by conducting fuel cut recovery that again injects a predetermined amount of fuel into selected cylinders from the injectors 7.

The rotation from the engine 1 is inputted to the automatic transmission 2 via the torque converter 3. The select gear position of the automatic transmission 2 is determined by controlling a control valve 13 that includes a plurality of shift solenoids 15 and 16 (only two shown for the sake of simplicity) to selectively turn them ON and OFF state disposed inside. The automatic transmission 2 causes the vehicle to run by changing the input rotation at a gear ratio corresponding to the select gear position and transmitting this gear-shift power from an output shaft 14 to at least one drive wheel 18. When the vehicle is in a coast running condition or state, i.e., when the accelerator pedal 4 is put in a released state, torque (power) is transferred from the drive wheel(s) 18 to the engine 1. When the vehicle is in a drive running condition or state, i.e., when the accelerator pedal 4 is depressed, torque (power) is transferred from the engine 1 to the automatic transmission 2.

The torque converter 3 houses an lockup clutch (not shown) that transmits rotation under torque increase and torque fluctuation absorption to an output element (turbine runner) via an internal working fluid by an engine-driven input element (pump impeller) (converter state) and causes the turbine rotation to be oriented toward the automatic transmission 2. In addition, the lockup clutch of the torque converter 3 is also configured and arranged for mechanically coupling the input/output elements and limiting the slip rotation (including a lockup state where the slip rotation is 0) between the engine 1 and the automatic transmission 2. In other words, the torque converter 3 is configured and arranged to transfer torque (power) from the engine 1 to the automatic transmission 2 in a non-slip lockup state where the slip rotation is 0, a slip lockup state where slip rotation between the input and output elements is limited due to a partially engagement of the lockup clutch, and a non-lockup state where the lockup clutch is completely disengaged.

The lockup pressure of the lockup clutch is determined by a drive duty command D of a lockup solenoid 17 that is disposed inside the control valve 13. The lockup clutch can limit the slip rotation of the torque converter 3 by causing the torque converter input/output elements to be coupled together. The lockup capacity is determined based on the lockup pressure applied to the lockup clutch. When the lockup pressure of the lockup clutch is at a level in which the lockup capacity is determined to be zero, this situation is determined to be a non-lock state where the input/output elements are not coupled at all. In contrast, when a lockup capacity is determined based on the lockup pressure applied to the lockup clutch, this situation is determined to be a lockup state (a non-slip lockup state or a slip lockup state) where the lockup pressure causes the input/output elements of the torque converter 3 to be at least partially coupled together. Thus, depending on the magnitude relation of the lockup capacity and the transmission torque between the input/output elements, the lockup state becomes one of a complete or non-slip lockup state where the input/output elements are coupled such that slip rotation does not arise at all and a slip lockup state where the input/output elements are coupled while slipping.

The ON and OFF states of the shift solenoids 15 and 16 and the drive duty command D of the lockup solenoid 17 are controlled by a transmission controller 21. The transmission controller 21 is operatively coupled to these components to control the operation of the transmission 2. In particular, the transmission controller 21 is operatively coupled to a plurality of sensors and/or switches, including but not limited to, the idle switch 12, to control the operation of the transmission 2. The signal I is outputted from the idle switch 12 that is indicative of when the acceleration pedal 4 is released or depressed, e.g., the idle switch 12 is switched "ON" when the acceleration pedal 4 is released. A signal is outputted from a throttle opening sensor 22 that is indicative of a throttle opening TVO of the throttle valve 5. A signal is outputted from an impeller rotation sensor 23 that is indicative of an input rotational speed Ni of the torque converter 3 from the engine 1. A signal is outputted from a turbine rotation sensor 24 that is indicative of an output rotational speed Nt of the torque converter 3 to the transmission 2. A signal is outputted from a transmission output rotation sensor 25 that is indicative of a rotational speed No of the transmission output shaft 14. Theses signals are inputted to the transmission controller 21. Between the engine controller 9 and the transmission controller 21, two-way communication is enabled, and cooperative control that executes fuel cutting or fuel cut recovery with respect to the engine 1 is conducted in accordance with the lockup state and release of the lockup clutch.

The transmission controller 21 preferably includes a microcomputer with a lockup capacity control program that controls the lockup capacity of the torque converter 3 as discussed below as well as other transmission control programs. The transmission controller 21 can also include other conventional components such as an input interface circuit, an output interface circuit, and storage devices such as a ROM (Read Only Memory) device and a RAM (Random Access Memory) device. While the engine controller 9 and the transmission controller 21 are shown as separate components, it will be apparent to those skilled in the art from this disclosure that they can be combined as a single unit with one or more processes. It will also be apparent to those skilled in the art from this disclosure that the precise structure and algorithms for the engine controller 9 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The transmission controller 21 conducts transmission control of the automatic transmission 2 as follows by a known operation on the basis of the input information.

First, the transmission controller 2 searches for a preferred gear position in the current vehicle running condition on the basis of a prepared transmission map from the throttle opening TVO and a vehicle speed VSP determined from the transmission output rotational speed No, and switches the shift solenoids 15 and 16 ON and OFF such that gear-shifting to the preferred gear position is conducted.

The transmission controller 21 also checks whether or not the lockup region is one where the torque increasing performance and the torque fluctuation absorbing function of the torque converter 3 are unnecessary from the input information. On the basis of the determination result, if the torque converter 3 is operating in a lockup region, then the transmission controller 2 places the torque converter 3 in a lockup state. In the lockup state, the input/output elements of the torque converter 3 are directly coupled by the locking up of the lockup clutch (rise in the lockup capacity) via the duty (D) control of the lockup solenoid 17. If the torque converter 3 is operating in a non-lockup or converter region, then the transmission controller 2 places the torque converter 3 in a converter state (non-lock state). In converter state (non-lock state), the directing coupling of the input/output elements of the torque converter 3 is released by the release of the lockup clutch (drop in the lockup capacity).

The lockup control is executed under constant speed drive-running conditions with a high vehicle speed that does not require the torque increasing action and the torque fluctuation absorbing action. The lockup control is also executed in order to transmit the rotation of the transmission output shaft 14 to the engine 1 in order to prevent engine stall under a coast-running condition that executes fuel cutting. The lockup control in this particular case is called a coast-time lockup control.

Next, the lockup control at the transient time from the drive time to the coast time conducted by the transmission controller 21, ordinary coast-time lockup control conducted thereafter, and a method of calculating the lockup pressure used in the control will be described in detail on the basis of the flow chart of FIG. 2. Between the engine controller 9 and the transmission controller 21, two-way communication is enabled, and Cooperative control between the engine controller 9 and the transmission controller 21 executes the fuel cutting or fuel cut recovery operations with respect to the engine 1 in accordance with the lockup state and release of the lockup clutch.

In the first step S1, it is determined whether or not the driver releases the acceleration pedal 4 and the vehicle begins a coast-running condition where the vehicle running condition moves from a slip lockup control under a drive-running condition to a coast-time lockup control, where the slip lockup control is conducted while the vehicle is in the coast-running condition. Thus, step S1 constitutes a vehicle running condition determining section configured to detect a vehicle running condition, e.g., a coast-running condition or a drive-running condition.

When it is determined in step S1 that the running condition will not move to a coast-time lockup control (NO), the present control ends and the control processing returns to step S1, where the move to a coast-time lockup control is monitored at prescribed intervals. When it is determined that the running condition will move to coast-time lockup control (YES), the control processing proceeds to step S2.

Figure 3:
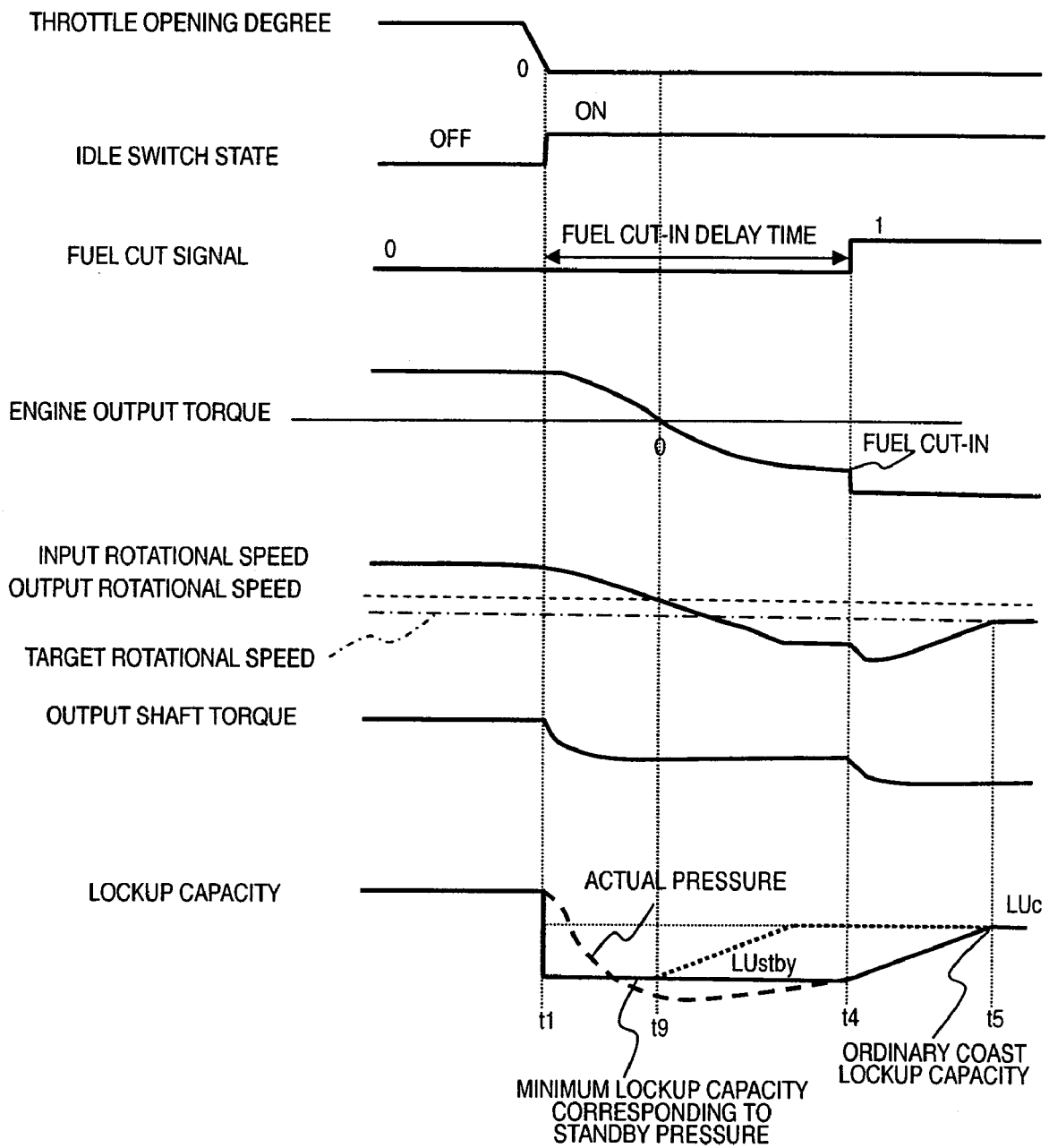
FIG. 3 is an operational time chart of the coast-time lockup control shown in FIG. 2 in accordance with the first embodiment of the present invention.

In step S2, a countdown of a fuel cut-in delay time Tslu of a coast fuel cut-in delay timer for determining the start timing of a fuel cutting operation at the time of coast-time lockup control is started. FIG. 3 is a time chart showing the throttle opening degree of the drive train of the present embodiment, the signal from the idle switch 12, a fuel cut signal, the output torque of the engine 1, the relationship between the input/output rotational speeds of the torque converter 3, a target slip rotational speed, the output shaft torque of the transmission output shaft 14, the lockup capacity, and changes in the lockup actual pressure. The start of the countdown of the fuel cut-in delay time Tslu of the coast fuel cut-in delay timer is at time t1 at the upper side of FIG. 3.

While fuel cutting is not being executed, a fuel cut signal (flag)=0 is outputted. However, from the time t4 and thereafter the countdown of the fuel cut-in delay time Tslu has expired, so that a fuel cut signal=1 is outputted in order to begin fuel cutting.

Next, in step S3, the lockup pressure Plu is lowered to a standby pressure Pstbysl that is necessary in order to place the lockup clutch in a state immediately before lockup begins. At the lower side of FIG. 3, the lockup capacity is reduced by feed forward control to a minimum lockup capacity LUstby corresponding to the standby pressure at the time t1.

Figure 7:
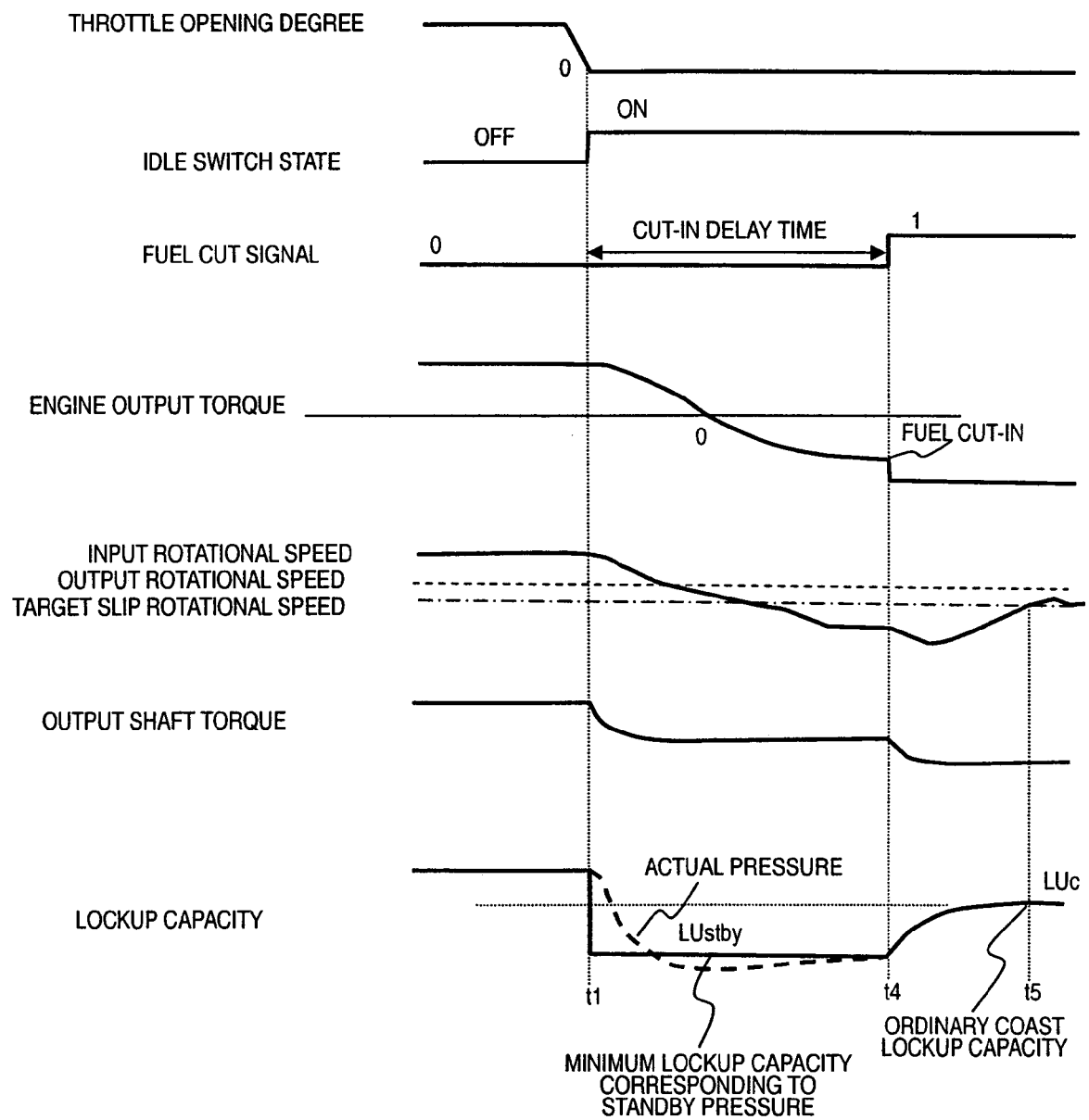
FIG. 7 is an operational time chart of the coast lockup control shown in FIG. 6 in accordance with the second embodiment of the present invention.

Now, the setting sequence of the timer Tslu will be described. As shown at the lower side of FIG. 3, there is the potential to undershoot the actual pressure of the lockup pressure Plu, as represented by the dotted line at the lower side of FIG. 3, due to the responsiveness of the oil pressure because the lockup capacity is abruptly reduced to the minimum lockup capacity corresponding to the standby pressure. In this case, the problem arises that the stroke of the lockup clutch returns to less than the minimum lockup capacity corresponding to the standby pressure, and then thereafter returns to the minimum lockup capacity LUstby corresponding to the standby pressure. Thus, in the present embodiment, in consideration of the responsiveness of the oil pressure, the fuel cut-in delay time Tslu is made longer than the aforementioned usual cut-in delay time. In other words, the fuel cut-in delay time Tslu of the present invention shown by t1 to t4 represented by the arrow in FIGS. 3 and 7 is set longer than the conventional cut-in delay time shown by time t1 to t2 in FIG. 9. Thus, at the fuel cut-in time (time t4), the drawback of the lockup capacity being insufficient so that a speedy lockup cannot be done can be avoided.

In the next step S4, it is determined whether or not the fuel cut signal is 1. When the fuel cut signal=0, the lockup pressure Plu is controlled to maintain the standby pressure Pstbyl of step S3. When the fuel cut signal=1, the lockup pressure Plu is raised at a constant ramp pitch Prampsl.

Figure 2:
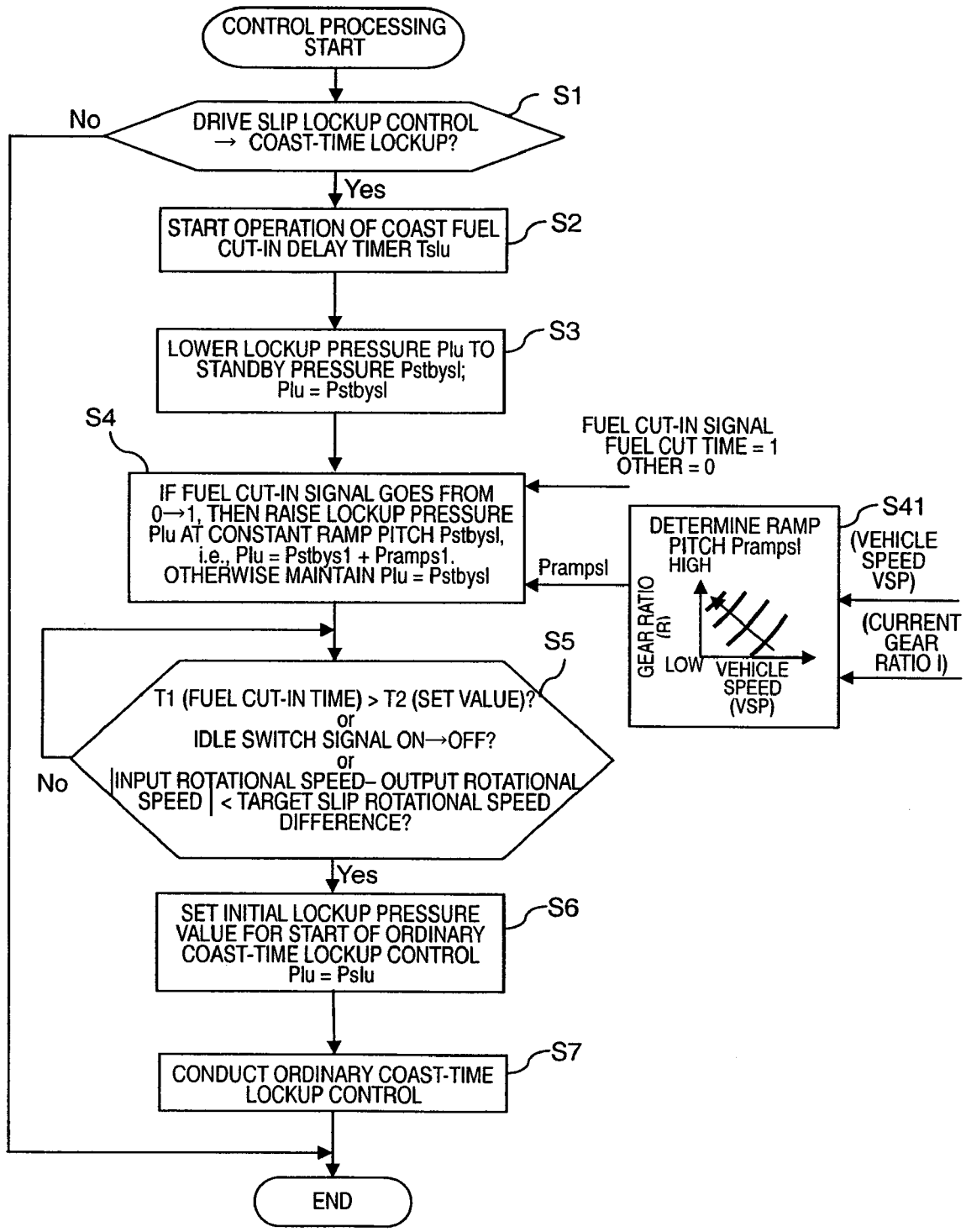
FIG. 2 is a flow chart showing a coast-time lockup control executed by the lockup capacity control device in accordance with the first embodiment of the present invention.
Figure 5:
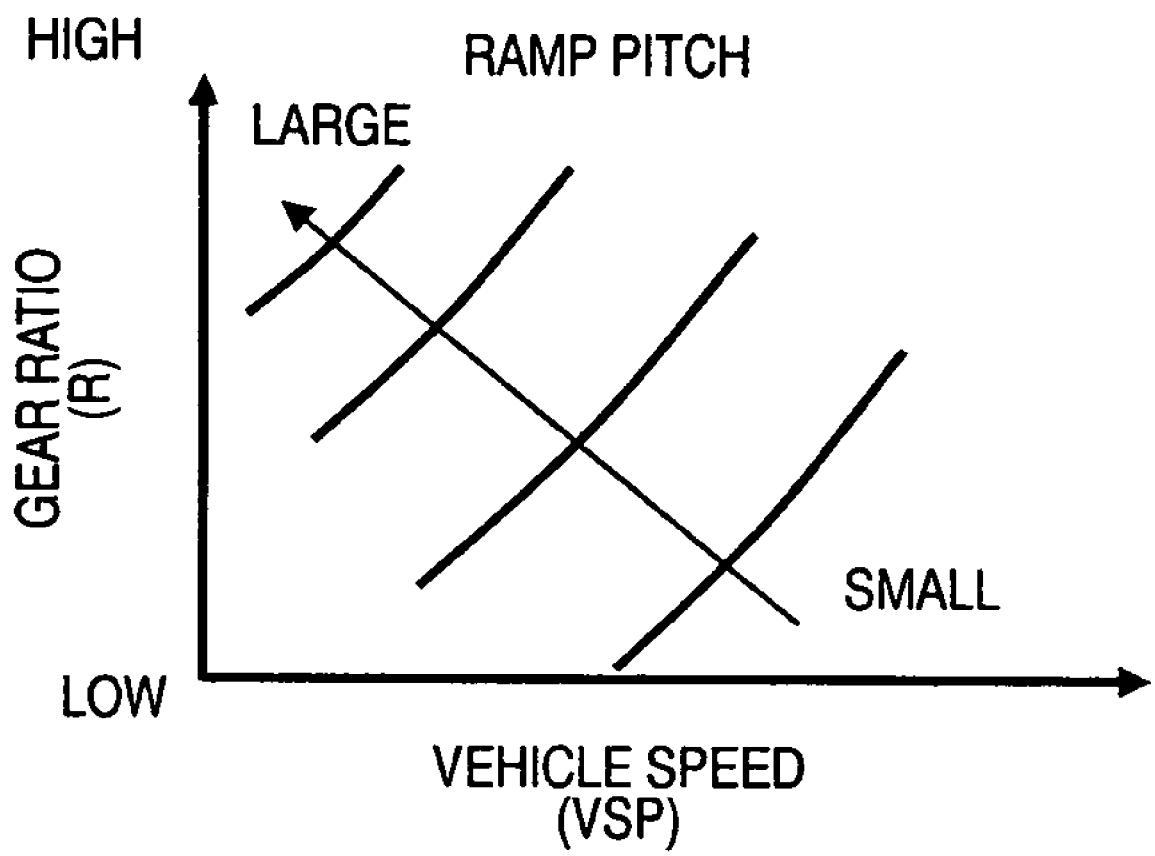
FIG. 5 is a search map that is referenced in order to determine a ramp pitch in the coast-time lockup control in accordance with the first embodiment of the present invention.

Specifically, in step S41 of FIG. 2, the current gear ratio R of the automatic transmission 2 and the vehicle speed VSP determined from the transmission output rotational speed No are read. Then, the search map shown in FIG. 5 is referenced to determine the ramp pitch Prampsl from the read values. Thus, in step S4, the determined ramp pitch Prampsl is added to the standby pressure-corresponding pressure Pstbysl to calculate the lockup pressure Plu when the fuel cut signal=1. The drive duty command D of the lockup solenoid 17 is controlled to become the lockup pressure Plu. As a result, the lockup capacity rises at a constant pitch from the time t4 to t5 at the lower side of FIG. 3.

Figure 4:
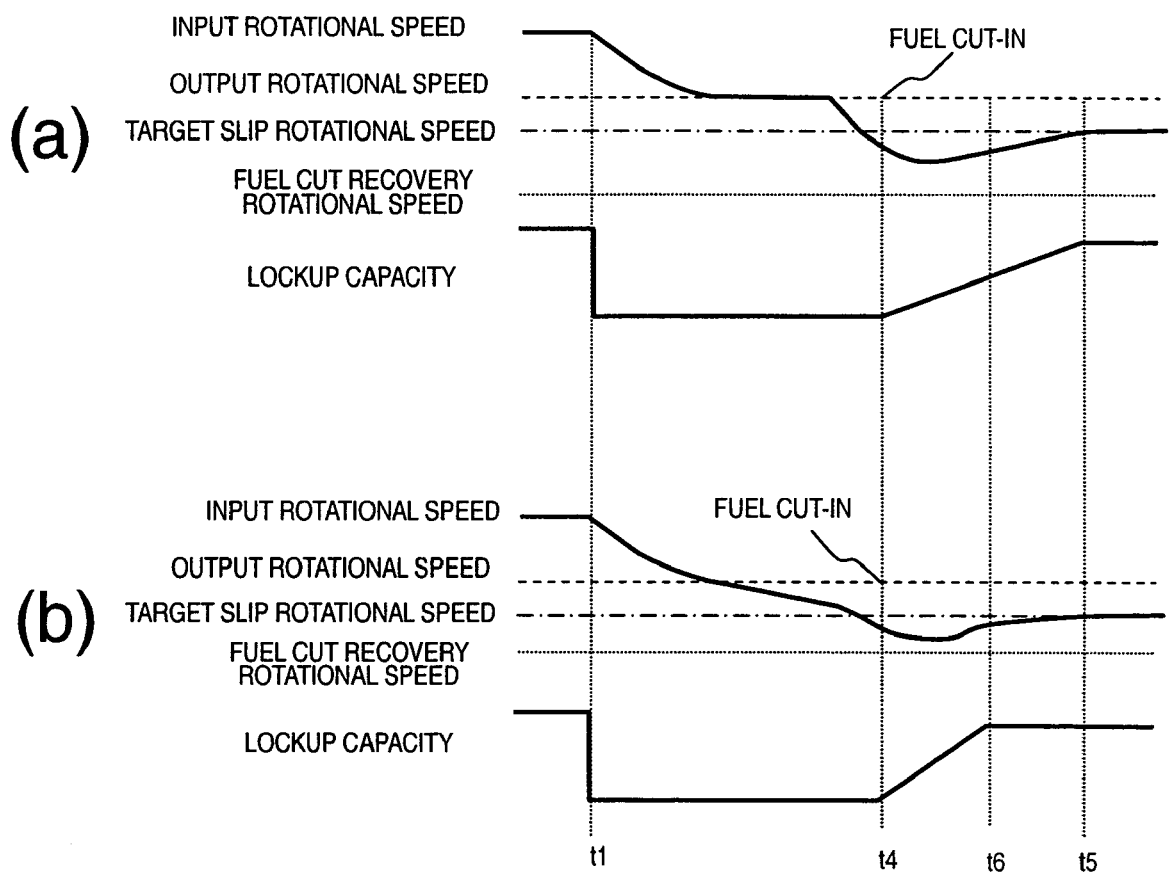
FIG. 4 is an operational time chart shown in FIG. 3, with portion (a) showing a state during coast-running at a high vehicle speed or low gear ratio, and portion (b) showing a state during coast-running at a low vehicle speed or high gear ratio in accordance with the first embodiment of the present invention.

Here, in the present embodiment, the ramp pitch Prampsl is controlled in accordance with the vehicle speed VSP and the gear ratio R. Namely, during a coast-running condition at a high vehicle speed or at a low gear ratio, the ramp pitch Prampsl is small and the lockup capacity gradually rises, as shown in the time t4 to t5 of portion (a) of FIG. 4. In contrast, during coast-running at a low vehicle speed or a high gear ratio, the ramp pitch Prampsl is large and the lockup capacity rapidly rises, as shown in the time t4 to t6 portion (b) of FIG. 4.

The reason for setting ramp pitch Prampsl in this manner is because the idling rotational speed of the engine becomes lower as the vehicle speed during a coast-running condition becomes lower, and thus, it is necessary to cause the ramp pitch Prampsl to rapidly rise because it is easy to fall into engine stall. The reason is also because the idling rotational speed of the engine becomes lower as the gear ratio during coast-running condition becomes higher, and thus, it is necessary to cause the ramp pitch Prampsl to rapidly rise because it is easy to fall into engine stall.

Thus, at the time t5 or t6, the input rotational speed represented by the solid line rises to the target slip rotational speed represented by the one-dot chain line and does not drop to the fuel cut recovery rotational speed represented by the dotted line. Thus, a situation can be avoided where the engine rotational speed that is the same rotational speed as the input rotational speed drops to the fuel cut recovery rotational speed, fuel cut recovery operates because of that, and the fuel is again injected. Therefore, the specific fuel consumption is not impaired.

In the next step S5, the following three determinations are conducted. A first determination is made as to whether or not a timer value T1 has exceeded a set value T2 where the timer value T1 is equal to the amount of time elapsed from the fuel cut-in time t4. A second determination is made as to whether or not the idle switch signal I has switched from the ON state to the OFF state. A third determination is made as to whether or not the absolute value of the difference between the input rotational speed Ni and the output rotational speed Nt is less than the target slip rotational difference. If at least anyone of these three determinations is YES, then the control processing proceeds to step S6. If all of these three determinations are NO, then the control processing again proceeds to step S5, and monitoring of these conditions is continued.

Next in step S6, the lockup pressure Plu is set to the slip lockup pressure Pslu when YES is determined in step S5, because the ordinary coast-time lockup control can be executed in that either the fuel recovery operation has been completed, the vehicle is accelerating, or the target slip rotational difference has reached a level that minimizes shock to the drive train.

Next, in step S7, the slip lockup pressure Pslu is applied to the lockup clutch and the ordinary coast-time lockup control is conducted. Thus, from the time t5 on, the ordinary coast lock-up capacity LUc necessary is executed for the lockup clutch to enter a slip lockup state as seen at the lower side of FIG. 3. Also, in FIG. 3, at a certain point in time, the input rotational speed Ni matches the target slip rotational speed (i.e., the target slip rotational difference subtracted from the output rotational speed Nt). Thus, steps S2 to S7 constitute a lockup capacity control section configured to control the lockup capacity of the torque converter 3 in accordance with the vehicle running condition.

As can be readily seen in FIG. 3, if a fuel cutting operation is to be performed in the slip coast-running condition, the lockup capacity control section executed in the flow chart of FIG. 2 is configured to control the lockup capacity to a first lockup capacity during a predetermined time (t1 to t4) from the acceleration pedal release at time t1 when the lockup capacity control section switches from a drive slip control to a coast slip control. Then, after the predetermined time (t1 to t4) has elapsed, the lockup capacity control section is further configured to control the lockup capacity to a second lockup capacity that is larger than the first lockup capacity after the predetermined time (t1 to t4) has elapsed. Accordingly, the fuel cutting operation is performed after a predetermined cut-in delay time elapses (t4) from the acceleration pedal release, with the predetermined time for switching from the first lockup capacity to the second lockup capacity being set to a time greater than the time from the acceleration pedal release (t1) to until the start of the fuel cutting operation (t4).

However, the processing for switching from the first lockup capacity to the second lockup capacity can also be conducted in a slightly different manner. Namely, as seen in the heavy dotted line in FIG. 3, the switch from the first lockup capacity to the second lockup capacity can also be conducted at the point in time t9 in FIG. 3 when the input rotational speed of the torque converter 3 falls below the output rotational speed of the torque converter 3. In other words, alternatively, the lockup capacity control section is further configured to set the predetermined time for switching from the first lockup capacity to the second lockup capacity to a value greater than a time (t1 to t9 in FIG. 3) from the acceleration pedal release to until an input rotational speed of the torque converter falls below an output rotational speed.

The effects of the coast-time lock-up control of the present embodiment will be described.

Figure 9:
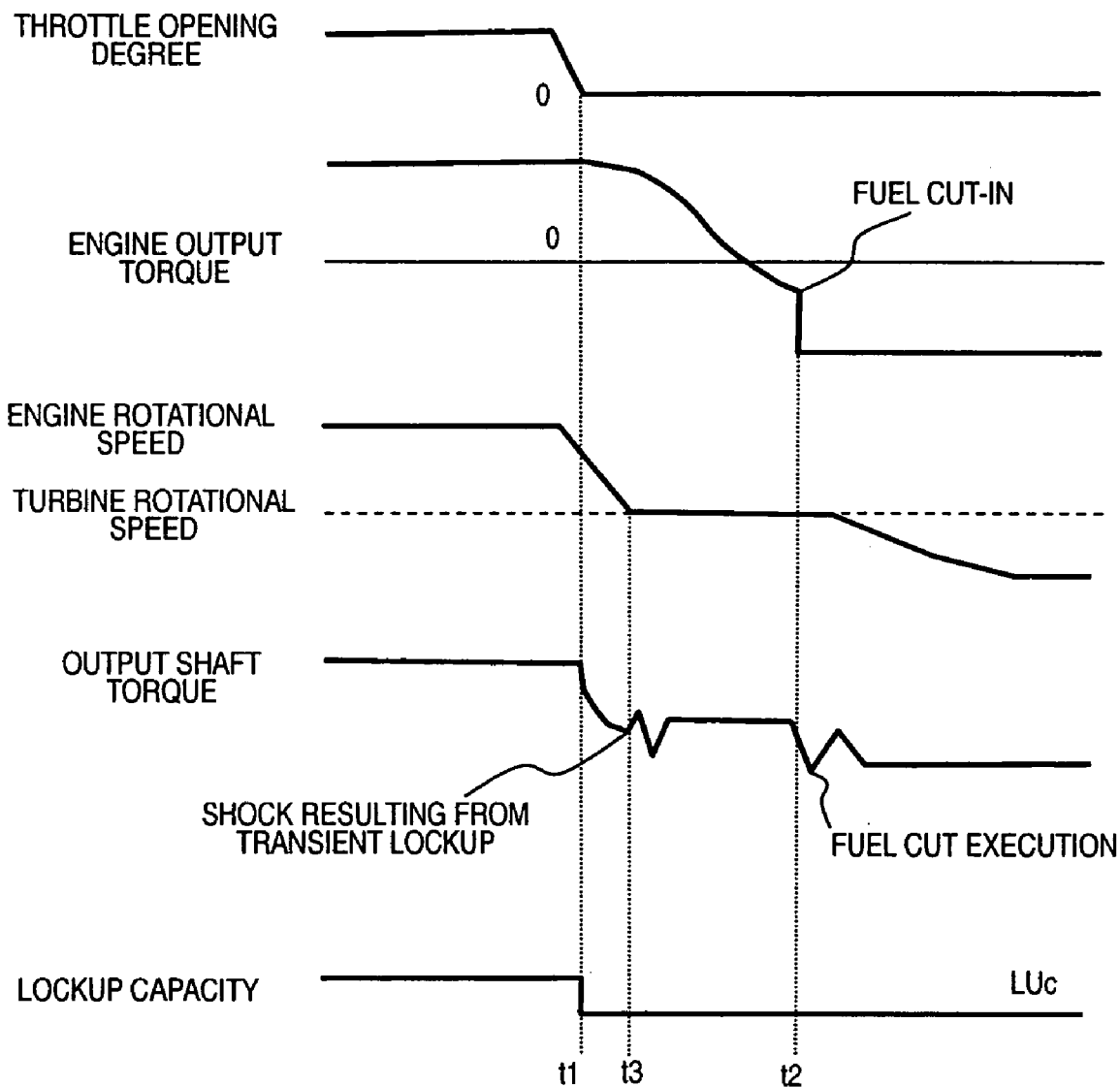
FIG. 9 is an operational time chart of conventional coast-time lockup control in accordance with the second embodiment of the present invention.

In the conventional lockup capacity control device shown in FIG. 9 and in the present embodiment shown in FIG. 3, during a drive-running condition in which the lockup clutch is in the slip lockup state, the input rotational speed Ni becomes higher than the output rotational speed Nt. In contrast, during a coast-running condition, the input rotational speed Ni becomes lower than the output rotational speed Nt. Thus, at a certain point in time from the time t1 when the throttle opening degree becomes zero to until the fuel cut-in time, the input rotational speed Ni becomes equal to the output rotational speed Nt.

In the conventional lockup capacity control device, as shown in FIG. 9, the engine output torque is reduced from the time t1 when the throttle opening degree becomes zero, but because the coast-time lockup capacity LUc is maintained, the lockup mechanism operates as described above at the time t3 when both the input rotational speed Ni and the output rotational speed Nt match. This results in a shock occurring in the output shaft torque of the automatic transmission, and the driver and passenger ride performance has been impaired.

However, according to the present embodiment, as shown in FIG. 3, because the lockup pressure is greatly lowered to the standby-corresponding pressure from the time t1 on when the throttle opening degree becomes zero, there is no lockup and a situation can be avoided where shock occurs in the output shaft torque. Thus, the ride performance is not impaired.

Figure 6:
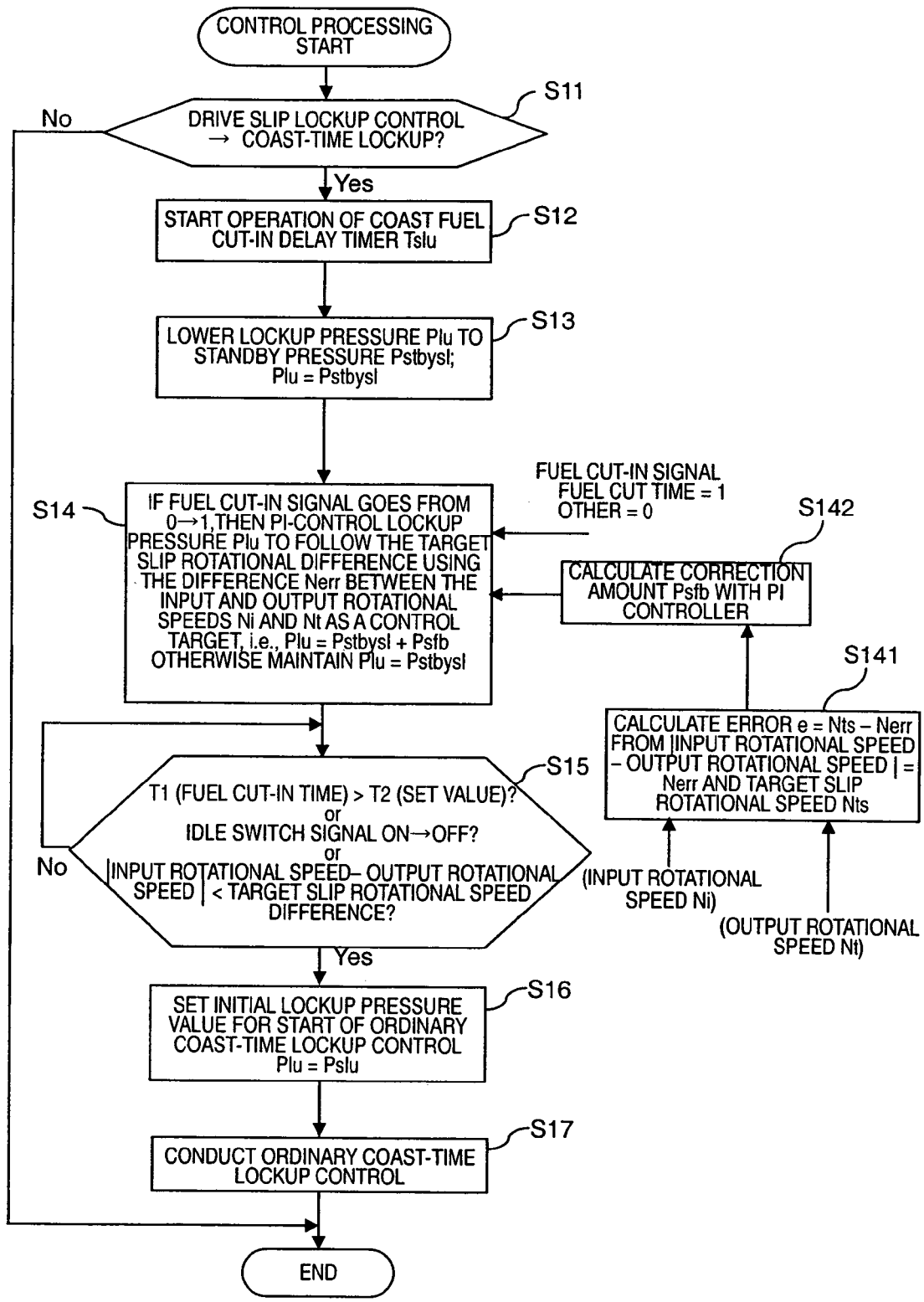
FIG. 6 is a flow chart showing a coast-time lockup control executed by the lockup capacity control device in accordance with a second embodiment of the present invention.

Next, the transient-time lockup control of the torque converter 3, the ordinary coast-time lockup control conducted thereafter, and a method of calculating the lockup pressure used in the control, which serve as another embodiment of the present invention, will be described in detail on the basis of the flow chart of FIG. 6.

In the first step S11, the same control as in step S1 is conducted. Namely, it is determined whether or not the driver releases the acceleration pedal 4 and the vehicle begins a coast-running condition where the vehicle running condition moves from a slip lockup control under a drive-running condition to a coast-time lockup control, where the slip lockup control is conducted while the vehicle is in the coast-running condition. When it is determined in step S1 that the running condition will not move to a coast-time lockup control (NO), the present control ends and the control processing returns to step S1, where the move to a coast-time lockup control is monitored at prescribed intervals. When it is determined that the running condition will move to coast-time lockup control (YES), the control processing proceeds to step S12. Namely, the countdown of the fuel cut-in delay time Tslu of the coast fuel cut-in delay timer for determining the start timing of fuel cutting at the time of coast-time lockup control is started in step S12.

FIG. 7 is a time chart showing the throttle opening degree of the drive train of the present embodiment, the signal from the idle switch 12, the fuel cut signal, the output torque of the engine 1, the relationship between the input/output rotational speeds of the torque converter 3, the target slip rotational speed, the output shaft torque of the transmission output shaft 14, the lockup capacity, and changes in the lockup actual pressure. The start of the countdown of the fuel cut-in delay time Tslu is at the time t1 at the upper side of FIG. 3. As mentioned in the description of the first embodiment, the fuel cut-in delay time Tslu is made longer than the common cut-in delay time.

While fuel cutting is not being executed, a fuel cut signal (flag)=0 is outputted, but from the time t4 on after the countdown has expired, a fuel cut signal=1 is outputted in order to begin fuel cutting by a predetermined amount of time.

Next, in step S13, the same control as in step S3 is conducted. Namely, the lockup pressure Plu is lowered to a standby pressure Pstbysl that is necessary in order to place the lockup clutch in a state immediately before lockup begins. At the lower side of FIG. 7, the lockup capacity is reduced by feedforward control to a minimum lockup capacity LUstby corresponding to the standby pressure at the time t1.

In the next step S14, it is determined whether or not the fuel cut signal is 1. When the fuel cut signal=0, the lockup pressure Plu is controlled to maintain the standby pressure-corresponding pressure Pstbyl of step S13. When the fuel cut signal=1, the lockup pressure Plu is PI-controlled to follow the target slip rotational difference using the difference Nerr between the input and output rotational speeds Ni and Nt of the torque converter 3 as a control target.

Specifically, in step S141 of FIG. 2, the absolute value Nerr of the difference between the inputted input rotational speed Ni and the output rotational speed Nt is calculated. Then, the feedback error e of the rotational difference Nerr and the target slip rotational difference Nts is calculated. In the next step S142, the feedback error e is passed through a PI controller to determine the lockup pressure feedback correction amount Psfb. Thus, in step S14, the lockup pressure feedback correction amount Psfb is added to the standby pressure-corresponding pressure Pstbysl of step S13 to calculate the lockup pressure Plu. The drive duty command D of the lockup solenoid 17 is controlled to become the lockup pressure Plu.

Figure 8:
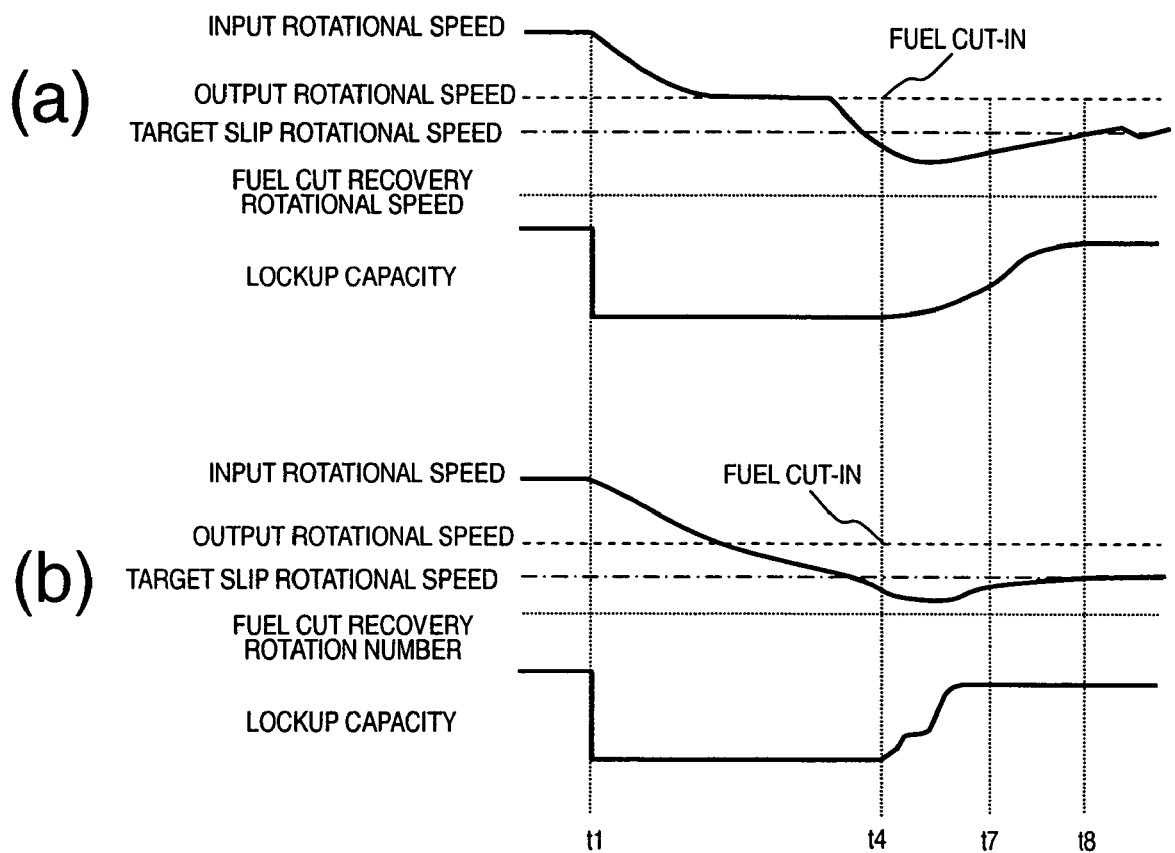
FIG. 8 is an operational time charts shown in FIG. 6, with portion (a) showing a case where an input/output element rotational difference is small in a transient state, and portion (b) showing a case where the input/output element rotational difference is large in the transient state in accordance with the second embodiment of the present invention.

Here, in the present embodiment, because the rotational difference Nerr is used as the control target, when the rotational difference Nerr is small at the fuel cut-in (time t4), and the lockup capacity gradually rises, as shown in the time t4 to t8 of portion (a) of FIG. 8. In contrast, when the rotational difference Nerr is large, the lockup capacity rapidly rises, as shown in time t4 to t7 of portion (b) of FIG. 8.

Thus, at the time t7 or t8, the input rotational speed represented by the solid line rises to the target slip rotational speed represented by the one-dot chain line and does not drop to the fuel cut recovery rotational speed represented by the dotted chain line. Thus, a situation can be avoided where the engine rotational speed that is the same rotational speed as the input rotational speed drops to the fuel cut recovery rotational speed, fuel cut recovery operates because of that, and the fuel is again injected. Therefore, the specific fuel consumption is not impaired.

In the next step S15, the same control as in step S5 is conducted. Namely, the following three determinations are conducted. A first determination is made as to whether or not a timer value T1 has exceeded a set value T2 where the timer value T1 is equal to the amount of time elapsed from the fuel cut-in time t4. A second determination is made as to whether or not the idle switch signal I has switched from the ON state to the OFF state. A third determination is made as to whether or not the absolute value of the difference between the input rotational speed Ni and the output rotational speed Nt is less than the target slip rotational difference Nts, i.e., determining the target slip rotation. If at least anyone of these three determinations is YES, then the control processing proceeds to step S16. If all of these three determinations are NO, then the control processing again proceeds to step S15, and monitoring of these conditions is continued.

In the next step S16, the lockup pressure Plu is set to the slip lockup pressure Pslu when YES is determined in step S15, because the ordinary coast-time lockup control can be executed in that either the fuel recovery operation has been completed, the vehicle is accelerating, or the target slip rotational difference has reached a level that minimizes shock to the drive train.

Next, in step S17, the slip lockup pressure Pslu is applied to the lockup clutch and the ordinary coast-time lockup control is conducted. Thus, from the time t5 on, the ordinary coast lock-up capacity LUc necessary is executed for the lockup clutch to enter a slip lockup state as seen at the lower side of FIG. 7. Also, in FIG. 7, at a certain point in time, the input rotational speed Ni matches the target slip rotational speed (i.e., the target slip rotational difference subtracted from the output rotational speed Nt). Thus, in this embodiment, steps S12 to S17 constitute a lockup capacity control section configured to control the lockup capacity of the torque converter 3 in accordance with the vehicle running condition.

Similar to the first embodiment, the processing for switching from the first lockup capacity to the second lockup capacity can also be conducted in a slightly different manner in this second embodiment. Namely, as seen in the heavy dotted line in FIG. 3, the switch from the first lockup capacity to the second lockup capacity can also be conducted at the point in time t9 in FIG. 3 when the input rotational speed of the torque converter 3 falls below the output rotational speed of the torque converter 3. In other words, alternatively, the lockup capacity control section is further configured to set the predetermined time for switching from the first lockup capacity to the second lockup capacity to a value greater than a time from the acceleration pedal release to until an input rotational speed of the torque converter falls below an output rotational speed.

Next, the effects of the coast-time lockup control of the preceding embodiment will be described.

In the preceding embodiment also, as shown in FIG. 7, because the lockup pressure is greatly lowered to the standby-corresponding pressure from the time t1 on when the throttle opening degree becomes zero, there is no lockup and a situation can be avoided where shock occurs in the output shaft torque. Thus, the ride performance is not impaired.

Incidentally, in the first embodiment and in the other embodiment, a torque converter lockup capacity control device comprises: an engine 1 that begins fuel cutting at a time t4 after the elapse of a predetermined cut-in delay time; and the slip ratio-variable torque converter 3 which, in accordance with a lockup capacity, completely locks, slip-locks, or non-locks an input element (pump impeller) driven by the engine 1 and an output element (turbine runner) that outputs the engine rotation to the automatic transmission 2, wherein when executing the fuel cutting, the torque converter 3 lockup capacity control device that controls the lockup capacity to lock the input/output elements conducts transient control of the lockup capacity in a transient state moving from a drive-time lockup control to a coast-time lockup control to prevent shock from occurring in the transient state.

Thus, the transient control of the lockup capacity of the present invention occurs: when the driver releases the acceleration pedal 4 during a drive-running condition, from the time t1 when the throttle opening degree becomes zero to until the time t4 when the fuel cut-in delay time Tslu of the coast fuel cut-in delay timer ends the countdown, the lockup capacity is lowered to the minimum capacity corresponding to the standby pressure to create a lockup or non-lockup state in a state where the slip ratio is high. Then, from the time t4 on, the lockup capacity is raised to the ordinary coast lockup capacity to create a lockup or complete lockup in a state where the slip ratio is low. As a result, the shock in the transient state occurring in the conventional lockup capacity control device that makes the lockup capacity the ordinary coast lockup capacity from the outset of the time t1 can be avoided. Consequently, both the prevention of engine stall at the time of fuel cutting and the prevention of shock at the transient time become possible, which is greatly effective in terms of fuel consumption performance and ride performance.

In the preceding embodiments, until the time t4 when the fuel cut-in delay time Tslu of the coast fuel cut-in delay timer ends the countdown, the lockup capacity is lowered to the standby pressure-corresponding LUstby necessary for placing the lockup capacity in a state immediately before lockup begins. Therefore, in the transient state of the time t1 to t4, there is no lockup and shock in the transient state can be avoided. Also, from the time t4 on, the lockup capacity can rapidly rise to the lockup capacity LUc.

The cut-in delay time is usually set to the time required for all of the intake air from the completely closed throttle valve to the combustion chamber to reach the engine. However, in the preceding embodiments, in consideration of the responsiveness of the oil pressure, the fuel cut-in delay time Tslu is made longer than the aforementioned usual cut-in delay time. Thus, the lockup capacity at the drive-time is abruptly reduced to the standby pressure-corresponding LUstby at the time t1, so that even if the actual pressure of the lockup pressure Plu undershoots as represented by the dotted lines at the lower sides of FIGS. 3 and 7, it is possible to return to the minimum capacity LUstby corresponding to the standby pressure by the fuel cut-in time (time t4). Thus, at the fuel cut-in time (time t4), the drawback of the lockup capacity being insufficient so that a speedy lockup cannot be done can be avoided. Consequently, a situation can be avoided where the lockup during fuel cutting is not in time, the engine rotational speed drops to the fuel cut recovery rotational speed, and fuel cut recovery operates. Thus, the deterioration of the specific fuel consumption resulting from re-injection of the fuel can be prevented.

In the embodiment described first, in step S41, the lockup capacity is caused to rapidly rise, as shown at the lower side of portion (b) of FIG. 8, as the vehicle speed becomes lower or as the change gear ratio selected by the automatic transmission 2 becomes higher. Thus, even at the low vehicle speed coast-running time or the high gear selection coast-running time where the idling rotational speed of the engine is low and where it is easy to fall into engine stall, a situation can be avoided where the engine rotational speed drops to the fuel cut recovery rotational speed and fuel cut recovery operates. Thus, the deterioration of the specific fuel consumption resulting from re-injection of the fuel can be prevented.

In the other embodiment, the lockup capacity control device includes the impeller rotation sensor 23 that detects the input rotational speed Ni and the turbine rotation sensor 24 that detects the output rotational speed Nt, and the transmission controller 21 calculates the difference Nerr between the detected input rotational speed and the output rotational speed. Then, the lockup capacity is feedback-controlled to follow the target slip rotational difference Nts. Thus, when the rotational difference Nerr is small, the input rotational speed can be precisely maintained at the target slip rotational speed, as shown in the portion (a) of FIG. 8. And even when the rotational difference Nerr is large, the lockup capacity rapidly rises, and from the time t7 on, the input rotational speed can be precisely maintained at the target slip rotational speed, as shown in the time t4 to t7 of the portion (b) of FIG. 8.

Consequently, a situation can be avoided where the engine rotational speed drops to the fuel cut recovery rotational speed and fuel cut recovery operates. Thus, the deterioration of the specific fuel consumption resulting from re-injection of the fuel can be prevented.

As used herein to describe the above embodiments, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A torque converter lockup capacity control device comprising:
a vehicle running condition determining section configured to detect a vehicle running condition; and
a lockup capacity control section configured to control a lockup capacity of a torque converter disposed between an engine and a transmission in accordance with the vehicle running condition,
the lockup capacity control section being further configured to control the lockup capacity to a first lockup capacity during a predetermined time from an acceleration pedal release when the lockup capacity control section switches from a drive slip control to a coast slip control, and the lockup capacity control section being further configured to control the lockup capacity to a second lockup capacity that is larger than the first lockup capacity after the predetermined time has elapsed.

2. The torque converter lockup capacity control device according to claim 1, wherein
the lockup capacity control section is further configured to set the predetermined time to a value greater than a time from the acceleration pedal release to until an input rotational speed of the torque converter falls below an output rotational speed.

3. The torque converter lockup capacity control device according to claim 2, further comprising
a fuel cut control section being further configured to start a fuel cutting operation after a predetermined cut-in delay time elapses from the acceleration pedal release, with the predetermined time being greater than a time from the acceleration pedal release to until the start of the fuel cutting operation.

4. The torque converter lockup capacity control device according to claim 1, wherein
the lockup capacity control section is further configured to set the first lockup capacity as a minimum lockup capacity immediate before the lockup clutch begins lockup.

5. The torque converter lockup capacity control device according to claim 3, wherein
the lockup capacity control section is further configured to set the predetermined cut-in delay time longer than a time necessary, after detecting a throttle valve disposed in the engine has been completely closed, for intake air between the throttle valve and a combustion chamber to reach the combustion chamber.

6. The torque converter lockup capacity control device according to claim 3, wherein
the lockup capacity control section is further configured to set the lockup capacity so as to rapidly rise as at least one of vehicle speed becomes lower and a change gear ratio selected by the transmission becomes higher after the elapse of the cut-in delay time.

7. The torque converter lockup capacity control device according to claim 1, further comprising
an input rotational speed determining section configured to detect an input rotational speed of an engine input element,
an output rotational speed determining section configured to detect an output rotational speed of a transmission output element, and
a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

8. The torque converter lockup capacity control device according to claim 2, further comprising
an input rotational speed determining section configured to detect an input rotational speed of an engine input element,
an output rotational speed determining section configured to detect an output rotational speed of a transmission output element, and
a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

9. The torque converter lockup capacity control device according to claim 3, further comprising
an input rotational speed determining section configured to detect an input rotational speed of an engine input element,
an output rotational speed determining section configured to detect an output rotational speed of a transmission output element, and
a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

10. The torque converter lockup capacity control device according to claim 4, further comprising
an input rotational speed determining section configured to detect an input rotational speed of an engine input element,
an output rotational speed determining section configured to detect an output rotational speed of a transmission output element, and
a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

11. The torque converter lockup capacity control device according to claim 5, further comprising
an input rotational speed determining section configured to detect an input rotational speed of an engine input element,
an output rotational speed determining section configured to detect an output rotational speed of a transmission output element, and
a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

12. The torque converter lockup capacity control device according to claim 6, further comprising
an input rotational speed determining section configured to detect an input rotational speed of an engine input element,
an output rotational speed determining section configured to detect an output rotational speed of a transmission output element, and a slip ratio calculating section configured to calculate a slip ratio based on a difference between the input rotational speed and the output rotational speed, with the lockup capacity control device controlling the lockup capacity so that the slip ratio calculated by the slip ratio calculating section follows a target slip ratio.

13. The torque converter lockup capacity control device according to claim 4, wherein the lockup capacity control section is further configured to set the predetermined cut-in delay time longer than a time necessary, after detecting a throttle valve disposed in the engine has been completely closed, for intake air between the throttle valve and a combustion chamber to reach the combustion chamber.

14. The torque converter lockup capacity control device according to claim 4, wherein the lockup capacity control section is further configured to set the lockup capacity so as to rapidly rise as at least one of vehicle speed becomes lower and a change gear ratio selected by the transmission becomes higher after the elapse of the cut-in delay time.

15. The torque converter lockup capacity control device according to claim 5, wherein the lockup capacity control section is further configured to set the lockup capacity so as to rapidly rise as at least one of vehicle speed becomes lower and a change gear ratio selected by the transmission becomes higher after the elapse of the cut-in delay time.

16. A torque converter lockup capacity control device comprising:

vehicle running condition determining means for detecting a coast running condition of a vehicle; and lockup capacity control means for controlling a lockup capacity of a torque converter disposed between an engine and a transmission in accordance with the vehicle running condition such that the lockup capacity is controlled to a first lockup capacity during a predetermined time from an acceleration pedal release when lockup capacity control switches from a drive slip control to a coast slip control, and after the predetermined time has elapsed, the lockup capacity is controlled to a second lockup capacity that is larger than the first lockup capacity.

17. A method of controlling a torque converter disposed between an engine and a transmission, comprising:

determining a coast running condition of a vehicle;

controlling a lockup capacity of the torque converter in accordance with the coast running condition;

controlling the lockup capacity to a first lockup capacity during a predetermined time from an acceleration pedal release when lockup capacity control switches from a drive slip control to a coast slip control; and further controlling the lockup capacity to a second lockup capacity that is larger than the first lockup capacity after the predetermined time has elapsed.

\* \* \* \* \*